US011325253B2

(12) United States Patent
Theobald (10) Patent No.: US 11,325,253 B2
(45) Date of Patent: May 10, 2022

(54) AUTONOMOUS DEVICE FOR TRANSPORTING ITEMS

(71) Applicant: Vecna Robotics, Inc., Waltham, MA (US)

(72) Inventor: Daniel Theobald, Somerville, MA (US)

(73) Assignee: Vecna Robotics, Inc., Waltham, MA (US)

( * ) Notice: Subject to any disclaimer, the term of this patent is extended or adjusted under 35 U.S.C. 154(b) by 167 days.

(21) Appl. No.: 16/887,881

(22) Filed: May 29, 2020

(65) Prior Publication Data

US 2020/0298404 A1 Sep. 24, 2020

Related U.S. Application Data

(63) Continuation of application No. PCT/US2017/065508, filed on Dec. 11, 2017.

(51) Int. Cl.
| | |
|---|---|
| *B25J 9/16* | (2006.01) |
| *B65G 65/00* | (2006.01) |
| *B25J 9/00* | (2006.01) |
| *B25J 9/12* | (2006.01) |
| *B25J 13/08* | (2006.01) |
| *B25J 15/00* | (2006.01) |

(52) U.S. Cl.
CPC ........... *B25J 9/1653* (2013.01); *B25J 9/0009* (2013.01); *B25J 9/0093* (2013.01); *B25J 9/123* (2013.01); *B25J 9/126* (2013.01); *B25J 9/162* (2013.01); *B25J 9/1679* (2013.01); *B25J 9/1697* (2013.01); *B25J 13/088* (2013.01); *B25J 15/0014* (2013.01)

(58) Field of Classification Search
CPC ........ B25J 5/007; B25J 9/0009; B25J 9/0093; B25J 9/041; B25J 9/123; B25J 9/126; B25J 9/162; B25J 9/1653; B25J 9/1679; B25J 9/1697; B25J 13/088; B25J 15/0014; B25J 15/06; B65G 65/00; B65G 65/005; B66F 9/063; B66F 9/07563; B66F 9/125; B66F 9/181; B66F 9/182; G05B 19/41895; G05D 2201/0216; Y10S 901/01

See application file for complete search history.

(56) References Cited

U.S. PATENT DOCUMENTS

| | | | |
|---|---|---|---|
| 5,018,923 A | 5/1991 | Melan et al. | |
| 7,348,747 B1 | 3/2008 | Theobald et al. | |
| 7,719,222 B2 | 5/2010 | Theobald | |
| 7,902,784 B1 | 3/2011 | Theobald | |
| 9,466,046 B1 | 10/2016 | Theobald | |
| 11,124,401 B1 * | 9/2021 | Jarvis | B65G 1/1373 |
| 2011/0288684 A1 | 11/2011 | Farlow et al. | |
| 2016/0355337 A1 | 12/2016 | Lert et al. | |
| 2017/0107055 A1 * | 4/2017 | Magens | B66F 9/145 |
| 2017/0305694 A1 | 10/2017 | McMurrough et al. | |
| 2018/0305124 A1 * | 10/2018 | Guo | B25J 19/002 |
| 2020/0324972 A1 * | 10/2020 | Cheng | B65G 1/1375 |

* cited by examiner

*Primary Examiner* — Dale Moyer (57) ABSTRACT

A fully autonomous mobile robot is provided that transports items from one area to another. The mobile robot includes a variety of mechanisms that capture an item from a first surface and moves the item within the confines of the mobile robot. The item can then be transported to another surface either within the confines of the mobile robot or to another location.

20 Claims, 5 Drawing Sheets

AUTONOMOUS DEVICE FOR TRANSPORTING ITEMS

PRIORITY INFORMATION

The present application is a continuation of International Application No.: PCT/US2017/065508, filed Dec. 11, 2017, the contents of which are herein incorporated by reference in its entirety.

BACKGROUND OF THE INVENTION

1. Technical Field

The present disclosure relates generally to item or article handling and transporting and, more particularly, to an autonomous mobile device that transports articles.

2. Background Information

Transporting articles from one location to another is a common task undertaken by a majority of businesses and various other enterprises, and is sometimes generally referred to as "material handling". The military and shipping services such as the U.S. Postal Service, DHL, FedEx® and the like as well as on-line retailers such as Amazon, Walmart and Target, for example, utilize supply chains to pickup, transport and deliver various types of articles between different locations worldwide. The term "logistics" may be used to describe flow management of the articles and information for transporting, inventorying, warehousing, material handling and packaging of the articles within such supply chains.

Typical material handling and logistical tasks may include handling articles at their source, their destination and many points in-between. These tasks frequently involve picking a number of items from a shelf or the like and transporting them to a shipping area where they are loaded onto trucks or containers for shipping to another location. These tasks may also involve unpacking the articles at their destination for storage, use, delivery or further transportation. Additionally, articles frequently are moved and stored at various places at various times within a particular building or group of buildings, such as in a manufacturing operation, hospital, or warehouse as well as an aircraft, ship, cargo plane or other military environment.

At their source, order picking (also referred to as "palletizing") typically is employed in a warehouse or other location where a number of articles are taken from a number of source locations, such as shelves, pallets or other areas, for example, and transported to a shipping area or loading dock or similar area where it may be packaged, such as with strapping, shrink wrap or the like, and loaded into a transport vehicle such as, for example, a truck, rail car, plane, helicopter, ship or other vehicle.

At their destination, the articles are removed from their transport vehicles and may subsequently be placed in another transport vehicle or another storage, distribution or sales location for further shipment, storage, sale or use. This process and associated tasks are routinely undertaken by businesses on a daily basis and are an integral part of providing cargo for private and military use in locations around the world and must be accomplished with a high degree of accuracy to avoid additional costs and to sustain or increase customer satisfaction.

In many operations, order picking and pallet or container loading and unloading is traditionally performed using manual labor, which is not only time consuming and labor intensive, but is subject to errors and injury to workers particularly with heavier loads. Additionally, workers typically use various types of equipment to make such tasks easier, such as forklifts, pallet jacks and conveyor belts, for example, which not only require a substantial amount of capital for purchasing and maintaining such equipment but are limited in the environments where they can be employed and create serious safety hazards in the work environment.

Although automated systems have been developed, they typically are fixed installation types of systems that require a substantial amount of infrastructure installation and facility renovation and simply cannot be flexibly deployed in different warehouses, manufacturing facilities, planes, ships or other environments as needed. This required infrastructure and renovation not only dramatically increases the cost, complexity and maintenance of such systems, but also limits their application to large warehouses and operations with significant budgets. Additionally, if such systems go down for repair or maintenance the entire material handling operation is typically shut down if not significantly disrupted since those systems take up a substantial amount of floor space thereby inhibiting any backup systems from being employed, such as using forklifts or fork trucks, for example.

It would be desirable therefore to provide a readily deployable and near-zero infrastructure solution to the above and other needs.

SUMMARY OF THE DISCLOSURE

A fully autonomous mobile robot is provided that transports items from one area to another. The mobile robot includes a robot body including at least a drive system for autonomously moving the mobile robot to various positions in an environment as desired and an elevator mechanism secured to the robot body, the elevator mechanism at least including a movable platform and a first mechanism for providing vertical movement of the movable platform with respect to the robot body.

A substantially round rotary table is integrally formed with the movable platform and in operable communication with the elevator mechanism and a second mechanism for providing rotary movement of the rotary table substantially in a horizontal plane with respect to the movable platform and the robot body. An end effector is integrally formed with the rotary table and a third mechanism for providing liner movement of the end effector substantially in a horizontal plane and substantially along a diameter of the rotary table as well as extending to a first position outside of the rotary table, the elevator mechanism and the mobile robot so that the end effector can move an item from a first surface external to the mobile robot onto the rotary table of the mobile robot.

Also included are at least one pair of fork members, one each positioned on opposite sides of the end effector and a fourth mechanism for providing liner movement of the fork members substantially in a horizontal plane and substantially along a diameter of the rotary table, the fork members working in tandem with the end effector to provide support for the item as it is moved by the end effector from the first external surface onto the rotary table of the mobile robot as needed. A sensor system is included having a variety of sensors positioned about the mobile robot for enabling movement of the mobile robot in the environment as well as at least determining appropriate positions for the end effector to effectively capture the item for movement from the first external surface onto the rotary table of the mobile robot; and A control system is provided in operable communication at least with the drive system, the elevator mechanism, the rotary table, the end effector, the pair of fork members, the sensor system and a communication system external to the mobile robot, the control system at least enabling the mobile robot to receive instructions with regard to a particular item to be captured, autonomously moving the mobile robot to a position proximate the item to be captured, activating the elevator mechanism to a horizontal height substantially corresponding to the item, activating the rotary member and both the end effector and the pair of fork members to capture the item and assist with its transport onto the rotary table as needed and activating the elevator mechanism, rotary table, end effector and pair of fork members to move the item from the rotary table to a second surface as desired.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DETAILED DESCRIPTION OF THE INVENTION

Autonomous devices, systems and/or methods may perform one or more tasks without continuous outside control and/or intervention. An autonomous mobile robot, for example, may receive instructions to perform a certain task at a certain location. The mobile robot may subsequently determine and perform the operation(s) necessary to move to the location and/or complete the task based on, for example, its current location, surrounding obstacles, its operating environment, the type of task to be performed, etc. Such autonomous devices, systems and/or methods may also adapt to unknown, new and/or changing operating environments without additional outside control and/or intervention.

Autonomous devices, systems and/or methods may be fully autonomous or semiautonomous. The term "fully autonomous" is used to describe a device, system and/or method that may perform one or more tasks without, for example, any outside control and/or intervention. A fully autonomous mobile robot, for example, may perform a task without receiving instructions (e.g., vectors, commands, etc.) from a human operator during performance of the task. The term "semi-autonomous" is used to describe a device, system and/or method that may perform one or more tasks without, for example, continuous outside control. A semi-autonomous mobile robot, for example, may perform a task utilizing one or more periodic instructions from a human operator that bound and/or qualify the performance of the task. The instructions, for example, may provide an updated location of where the task is to be performed, identify an unknown obstacle, control the scope of the task, control when the task should be performed, etc.

Although many advance robots today integrate mechanical arms and end effectors to grasp items, the present applicants recognized a shift away from that methodology. This shift recognizes that the state of the art in robotics today simply cannot provide a mechanical arm that can move fast enough to fulfill many customer needs. For example, in the incredibly advancing logistics or pick and place industries the number of "picks" per hour or minute is the most important criteria. Thus, unless robots can approach the number of picks that a human can achieve in a given time period, robots may not be very helpful.

In order to bridge this gap, the present applicants recognize that the most time and energy efficient way to perform a variety of tasks is to let humans accomplish the tasks they can do well and quickly and let robots accomplish the tasks they can do well and quickly. This includes designing robots that work side by side with humans in a variety of environments where safety is very important.

Additionally, the approach of the present disclosure teaches away from the current robot design by somewhat down-teching the robot from a full mechanical arm to a number of more discrete limited motion mechanisms. This design enables the use of both cheaper and faster components that can enable the mobile robot to achieve picking speeds proximate that of a human. They also tend to give a level of comfort to humans working with the robot since the human can see the constraints or boundaries within which the robot can move and more accurate determine how to stay out of the robot's way and maintain safety.

Figure 1:
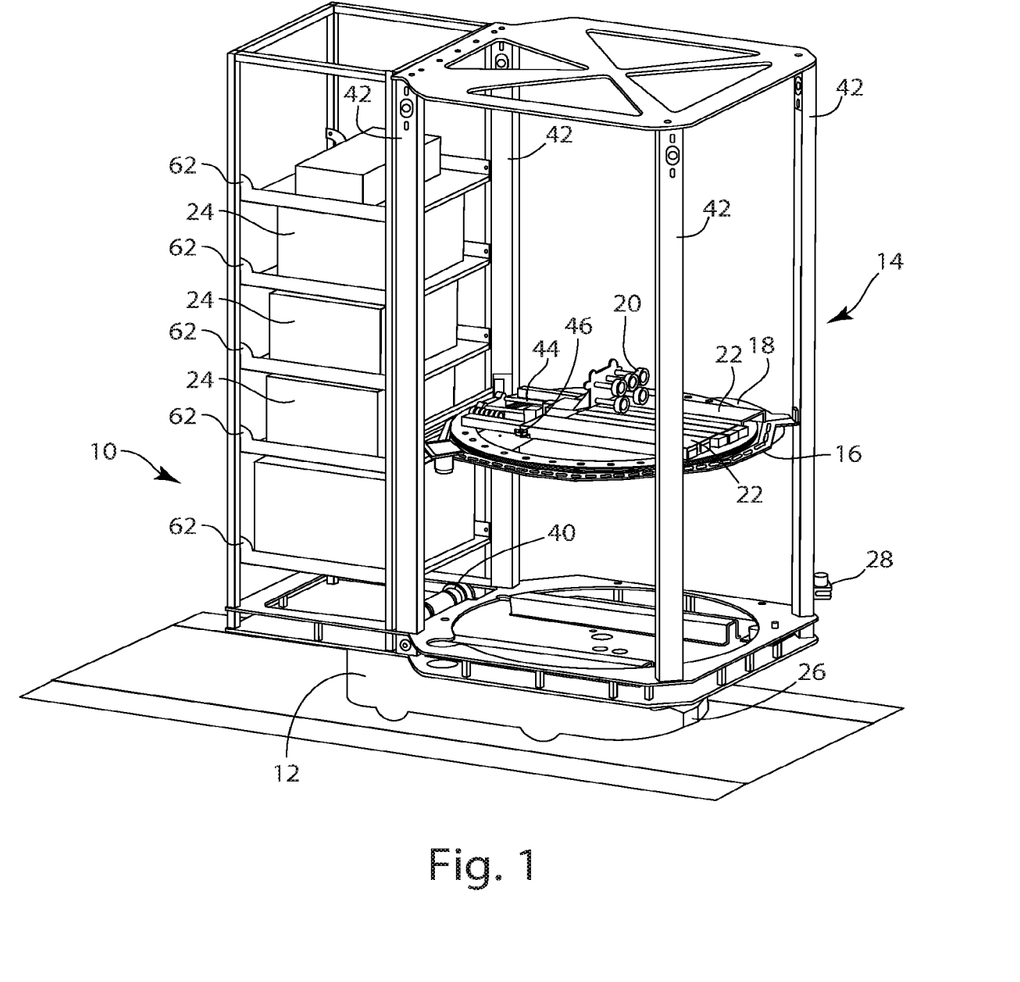
FIG. 1 is a perspective view of one embodiment of the mobile robot of the present disclosure.

FIG. 1 illustrates one embodiment of an electro-mechanical mobile device or robot 10 illustrating the new approach to robot design of the present disclosure. The mobile robot 10 substantially includes a robot body 12 and an elevator mechanism 14. The elevator mechanism at least having a movable platform 16 with a rotary table 18, an end effector 20 and a pair of fork members 22.

As described in more detail below and generally illustrated in FIGS. 1, 3 and 4, the mobile robot 10 autonomously performs a task of loading one or more items or articles 24 onto the rotary table 18 for movement of the item 24 to another location. Examples of articles include boxes, crates, containers, plastic or metal totes, packages, barrels, canisters, luggage, chests, and amorphous bags, sacks and other such objects. The present disclosure of course is not limited to any particular article or configuration.

Figure 3:
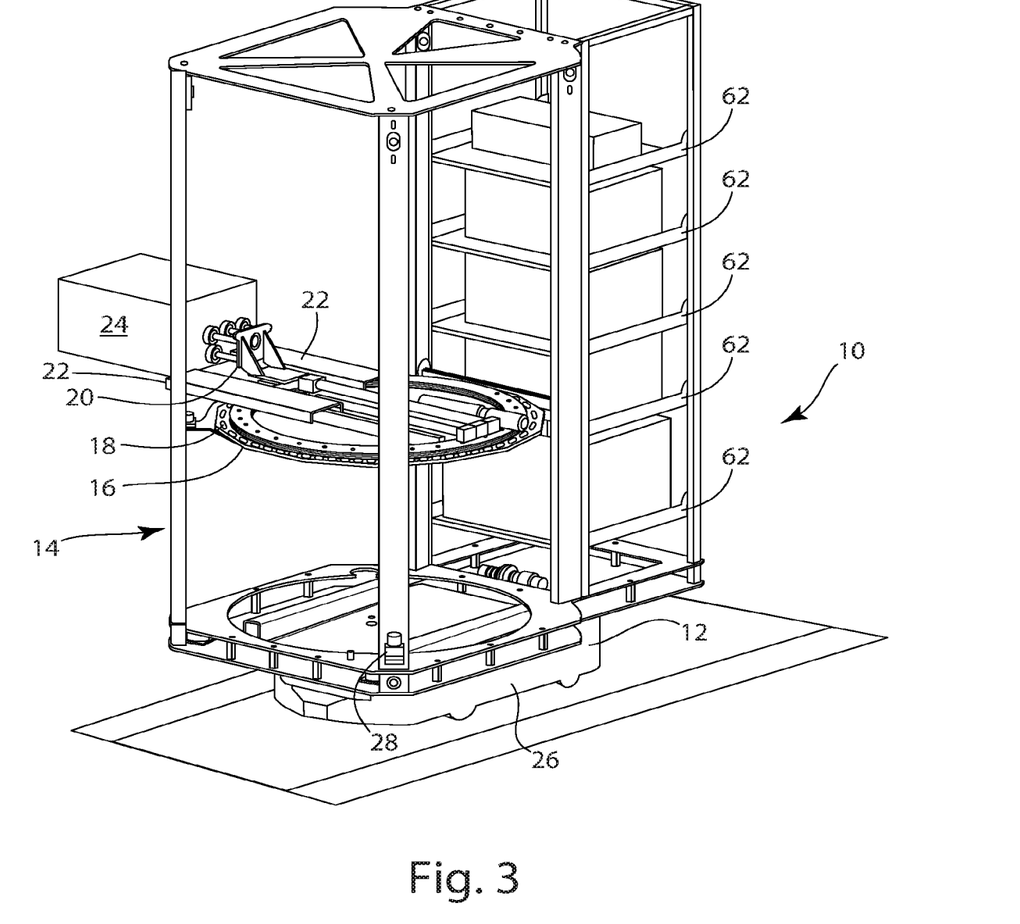
FIG. 3 is another perspective view of one embodiment of the mobile robot of the present disclosure illustrating one operational position of the mobile robot.
Figure 4:
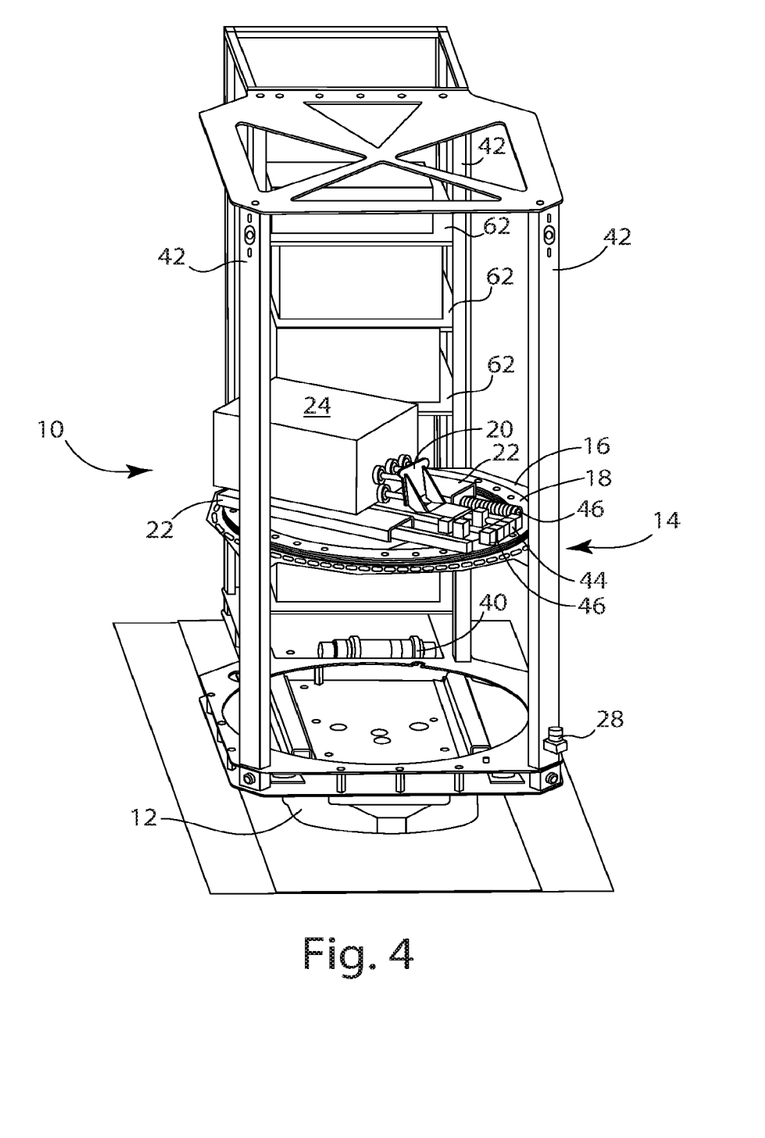
FIG. 4. is another perspective view of one embodiment of the mobile robot of the present disclosure illustrating another operational position of the mobile robot.

Briefly, in operation and with reference to FIGS. 3 and 4, a control system 26 in the robot body 12 receives instructions from sources outside of the mobile robot 10 with regard to a particular item 24 to be picked by the mobile robot 10 where item 24 initially is positioned on a first surface (not illustrated) external to the mobile robot 10 as illustrated in FIG. 3. The first surface can be a shelf of a storage system or rack, for example, as well as another robot, conveyor or any other surface as desired. The shelf may be in a building such as a warehouse or may be positioned within a delivery truck, airplane, ship or any other location where items 24 may be stored.

As the mobile robot 10 positions itself with respect to item 24 on the first surface, the control system 26 along with one or more sensors 28 and other components as described in more detail below ensures the mobile robot 10 is close enough to the item 24 for the end effector 20 to capture the item 24. Once in position, the control system moves the movable platform 16 to the correct height for capturing the item 24, rotates the rotary table 18 to the correct position and extends the end effector 20 and the pair or forks 22 outward from the mobile robot 10 to the item 24. When close enough to the item 24, the end effector 20 is activated to capture or grasp the item 24 and pull it onto the forks 22 and within the confines of the rotary table 18 and the mobile robot 10.

Figure 2:
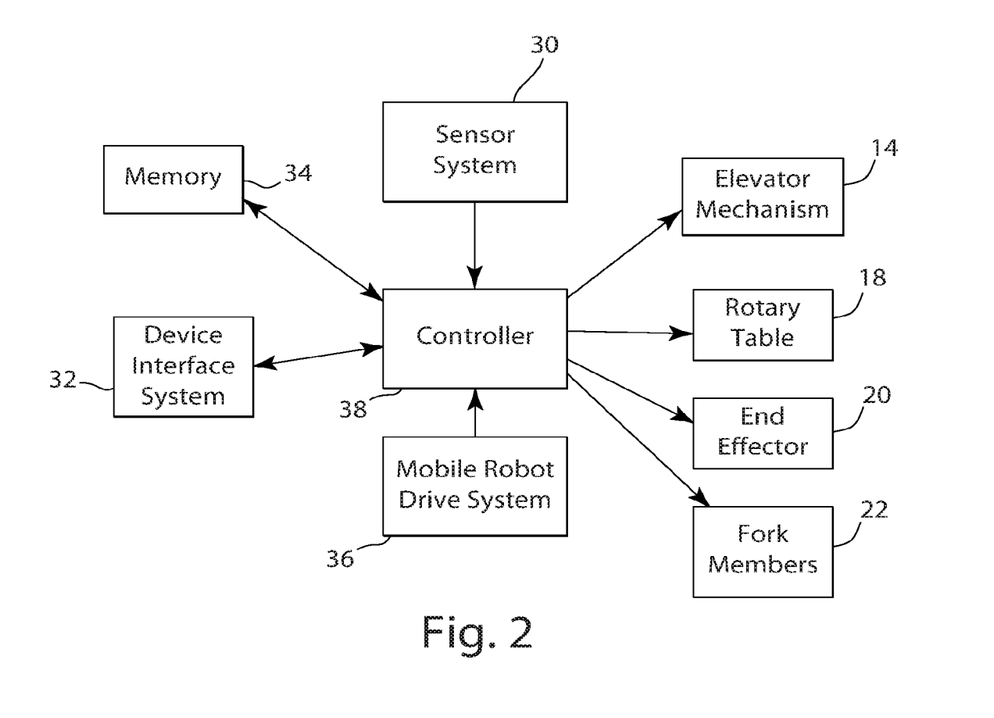
FIG. 2 is a system block diagram illustration of one embodiment of the mobile robot of the present disclosure.

FIG. 2 is a system block diagram illustration of the mobile robot 10. The mobile robot 10 includes device electronics and/or mechanisms operable to (e.g., fully and/or semi-) autonomously perform one or more tasks such as, for example, moving the mobile robot 10 to various location and loading article(s) onto support surface(s) as illustrated in FIGS. 1, 3 and 4. The device electronics and/or mechanisms may include a sensor system 30 having sensors 28, a device interface system 32, memory 34, a mobile robot drive system 36, the elevator mechanism 14, the rotary table 18, end effector 20, pair of fork members 22 and a controller 36. The present disclosure of course is not to be limited to the aforesaid electronics and/or mechanisms, and may include alternate electronics and/or mechanisms other than those specifically described herein as well as known or future equivalents thereof.

The sensor system 30 is configured to survey the mobile device's surroundings and operating environment, and/or to receive location data. The sensor system 30 may include, for example, one or more location and/or proximity sensors that spatially locate (e.g., triangulate) the mobile robot 10 relative to, for example, its surrounding environment, its geographic location, and/or one or more locators (e.g., RF tags, physical landmarks, etc.). Examples of location and/or proximity sensors include, but are not limited to, global positioning system (GPS) receivers, radar systems, sonar systems, infrared sensors, lasers, cameras, radio transceivers, etc. The sensor system 30 may additionally or alternatively include one or more cameras, one or more electro-acoustic transducers (e.g., microphones), etc.

Various sensors 28 are also positioned about the mobile robot 10 to ensure proper activation of the end effector 20, forks 22 and other components. These additional sensors 28 are not illustrated, but the type, number and position of sensors 28 can vary.

The device interface system 32 is configured to receive instructions (e.g., vectors, commands, etc.) in the form of control data from an operator and/or from a remote control system. The device interface system 32 may also be configured to communicate data to the operator and/or to the remote control system. The device interface system 32 may include a communication device and/or an operator interface. The communication device may include a cellular, satellite and/or radio transmitter, and/or a cellular, satellite and/or radio receiver. The operator interface may include one or more input and/or output (I/O) devices such as, for example, a display screen, a speaker, a touch screen, a keypad, a voice command system with an electro-acoustic transducer (e.g., microphone), etc.

The memory 34 (e.g., a non-transitory computer readable medium) may be configured to store software (e.g., program instructions) for execution by the controller 38. The memory may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAIVI), a video random access memory (VRAM), etc. Examples of a nonvolatile memory may include a read only memory (ROM), an electrically erasable programmable read-only memory (EEPROM), a computer hard drive, etc.

The mobile robot drive system 36 is configured to move the mobile robot 10 to various locations within its operating environment. The mobile robot drive system 36 may include one or more motorized and/or steerable propulsion devices such as, for example, motorized drive wheels, motorized track systems, etc. The present disclosure of course is not limited to the aforesaid mobile drive system configurations and components.

Referring again to FIG. 1, the elevator mechanism 14 includes a first mechanism 40 for providing vertical movement of the movable platform 16 within vertical frame rails 42. The first mechanism 40 can be electronically, hydraulically, pneumatically and/or mechanically actuated so long as it serves to raise the movable platform 16 vertically as desired. In one embodiment, the mechanism 40 can be in the form of a motor or winch in contact with a cable system (not illustrated) where a cable runs up each of the four elevator frame rails 42 and is in contact with the movable platform 16 to thereby raise and lower the moveable platform 16 by raising or lowering the cables. It is to be understood, however, that one skilled in the art could readily devise a number of mechanisms that can achieve the same result and that the present disclosure is no way limited to the type of first mechanism 40 utilized.

The rotary table 18 is integrally formed with the movable platform 16 and moves vertically along with the movable platform 16. The rotary table 18 includes a second mechanism 41 for providing rotational movement of the rotary table 18 with respect to the movable platform 16 and the mobile robot 10. The second mechanism 41 can be electronically, hydraulically, pneumatically and/or mechanically actuated so long as it serves to rotate the rotary table 18 with respect to the movable platform 16 as desired.

The end effector 20 is integrally formed with the rotary table 18 and rotates with the rotary table 18 and includes a third mechanism 44 that provides movement of the end effector 20 substantially in a horizontal plane and substantially along a diameter of the rotary table 18 and extends the end effector 20 to a first position outside the confines of the rotary table 18 as illustrated in FIG. 3. The third mechanism 44 can be electronically, hydraulically, pneumatically and/or mechanically actuated so long as it serves to move the end effector 20 with respect to the rotary table 18 as desired.

Examples of an end effector include, but are not limited to, a gripping device, a suction device, an electromagnet, a winch, a clasp, etc. Alternative examples of a manipulator system and end effectors are disclosed in U.S. Pat. Nos. 7,902,784; 7,719,222 and 7,348,747, each of which is hereby incorporated by reference in its entirety.

The pair of fork members 22 are likewise integrally formed with the rotary table 18 and rotate with the rotary table 18, one fork member 22 being positioned on opposite sides of the end effector 20 as illustrated in FIGS. 1, 3, and 4. A fourth mechanism 46 is included for providing linear movement of the fork members 22 substantially in a horizontal plane and substantially along a diameter of the rotary table 18. The fourth mechanism 46 can be electronically, hydraulically, pneumatically and/or mechanically actuated so long as it serves to move the forks 22 with respect to the rotary table 18 as desired and in some embodiments the third mechanism 44 can move both the end effector 20 and forks 22 and thus the fourth mechanism 46 may not be necessary.

In one embodiment, both the end effector 20 and fork members 22 are mounted on sliding rail structures (not illustrated) to provide the desired movement. It is to be understood, however, that the particular type of mechanism used to move the end effector 20 and fork members 22 can vary.

As illustrated in FIGS. 3 and 4, the fork members 22 work in tandem with the end effector 20 to provide support for the item 24 as the item 24 is moved by the end effector 20 from the first external surface onto the rotary table 18 as needed. In some embodiments, the end effector 20 may have sufficient griping power so that the item 24 is pulled from the first surface and remains above the surface of the forks 22 which then merely serve as a safety system in the event the item 24 is dropped by the end effector 20. In other embodiments, the end effector 20 pulls the item 24 onto the forks 22 which supports the item 24 during the operation of the mobile robot 10.

Referring again to FIG. 2, the controller 38 may be implemented using hardware or a combination of hardware and software. The controller 38 may include one or more processing devices, analog and/or digital circuitry, etc. The controller 38 is in signal communication (e.g., hardwired or wirelessly connected) with the sensor system 30, the device interface system 32, the memory 34, the mobile robot drive system 36 along with the elevator mechanism 14, rotary table 18, end effector 20, fork members 22 as well as the first, second, third and fourth mechanisms that provide movement to those respective members.

Figure 5:
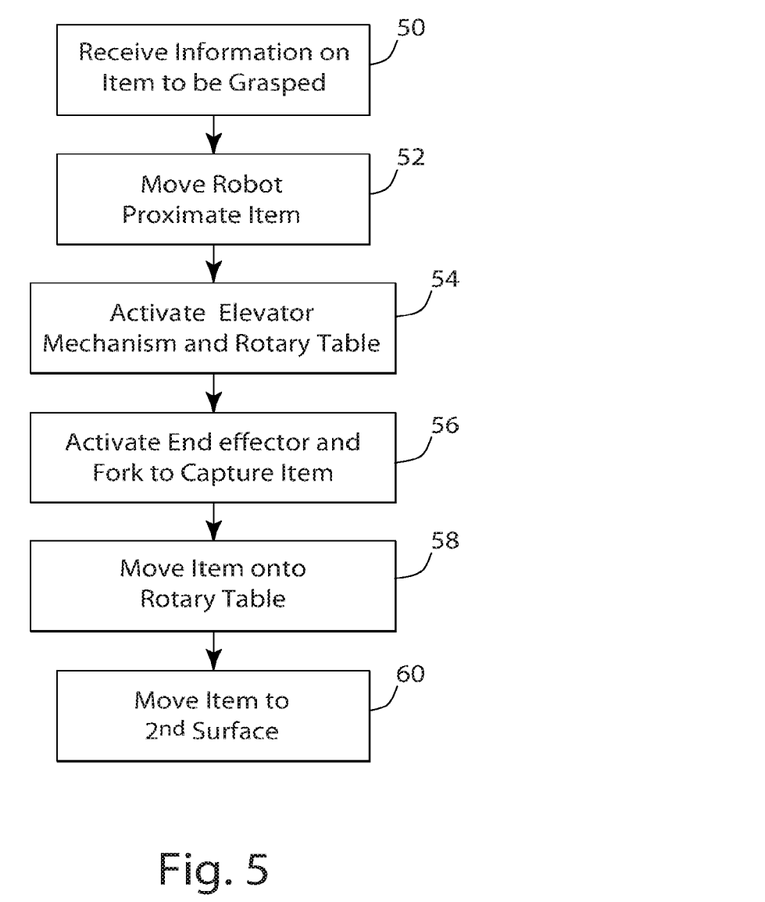
FIG. 5 is a flow diagram depicting some of the actions of at least one embodiment of the mobile robot of the present disclosure.

FIG. 5 is a flow diagram of a method for loading items 24 onto the mobile robot 10. In step 50, the controller 38 receives control data (e.g., one or more vectors, commands, etc.) through the device interface system 32. The control data may include inventory data, location data, etc. The inventory data may, for example, identify the contents, types, states (e.g., amorphous or non-amorphous), masses and/or weights, dimensions, et cetera, of the items 24 to be gathered or loaded. The location data may, for example, identify the respective item 24 pickup locations, and/or the respective first surface external to the mobile robot 10. Alternatively, the controller 38 may autonomously determine the item 24 pickup locations and/or the first surface locations using the sensor system 30 where, for example, the items 24 and/or the first surfaces are configured with RF ID tags, locator beacons, etc. The controller 38 may alternatively and/or additionally identify the items 24 using image and shape recognition software. The control data may also include other types of data such as, for example, scheduling data that designates on which first surface(s) and by when and/or in which order the items 24 should be loaded.

In step 52, the controller 38 moves the mobile robot 10 to a position proximate the item 24 location. At least the drive system 36 and sensor system 30 typically are utilized to accomplish this task.

In step 54, the controller 38 activates the elevator mechanism 14 to bring the movable platform 16 to a height proximate the bottom of the item 24 to be captured. The sensor system 30 typically is utilized to assist, but may not always be necessary.

In step 56 the controller 38 activates the end effector 20 and pair of forks 20 to move them radially outward to a position proximate the item 24 to be captured. The sensor system 30 typically is utilized to assist but may not always be necessary.

In step 58, the controller 38 activates the end effector 20 and pair of forks 22 to capture the item 24 and move the item onto the rotary table 18 of the movable platform 16. The item 24 thus is taken from its initial storage position, say on a shelf or the like, and transported onto the mobile robot 10.

In step 60, the controller 38 activates at least the end effector 20 and forks 22 to move the item 24 from the rotary table 18 onto a second surface. The second surface may be contained within the confines of the mobile robot 10, such as one more or more shelves 62 formed with the robot body 12, or may be in another location outside of the mobile robot 10 including locations where the mobile robot 10 must move to that location.

The second surface may also be provided in the form of another robot or any type of conveyor mechanism (not illustrated). Thus, the mobile robot 10 can move items 24 from one location to another or transfer the items 24 to another robot or conveyor system for further movement of the item 24 as desired.

A person of skill in the art will recognize that the methods of FIGS. 1-5 and the various embodiments thereof may be performed by devices and systems other than those specifically described above.

It is to be understood that the terminology used herein is used for the purpose of describing specific embodiments, and is not intended to limit the scope of the present disclosure. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this disclosure belongs.

Although the description above contains many specific examples, these should not be construed as limiting the scope of the embodiments of the present disclosure, but as merely providing illustrations of some of the presently preferred embodiments of the present disclosure. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present disclosure is not to be restricted except in light of the attached claims and their equivalents.

What is claimed is:

1. A method, comprising:
   receiving, at a controller of an autonomous mobile robot, control data, wherein the control data comprises inventory data indicating an item to be loaded on to the autonomous mobile robot;
   moving, by the controller, the autonomous mobile robot to a location of the item;
   activating, by the controller, an elevator mechanism secured to a robot body of the autonomous mobile robot to a position proximate the location of the item, wherein the elevator mechanism comprises at least:
      a movable platform to provide vertical movement with respect to the robot body;
      a rotary table integrally formed with the movable platform to provide rotary movement in a first horizontal plane with respect to the movable platform and the robot body;
      an end effector integrally formed with the rotary table to provide linear movement in a second horizontal plane and along a diameter of the rotary table; and at least one pair of fork members to provide linear movement in the second horizontal plane and along the diameter of the rotary table;

activating, by the controller, the movable platform, the rotary table, the end effector integrally formed with the rotary table, and the at least one pair of fork members to capture the item at the location; and activating, by the controller, the movable platform, the rotary table, the end effector integrally formed with the rotary table, and the at least one pair of fork members to move the item from the location to another location.

2. The method of claim 1, further comprising determining the location of the item in response to detecting, using a sensor system of the autonomous mobile robot, a locator beacon of the item.

3. The method of claim 1, further comprising determining the location of the item in response to identifying, based on one or more images of the item captured by the autonomous mobile robot, a shape of the item.

4. The method of claim 1, wherein the control data further comprises scheduling data that at least designates an order in which a set of items are to be loaded on to the autonomous mobile robot.

5. The method of claim 1, wherein the another location is positioned exterior to the autonomous mobile robot.

6. The method of claim 1, wherein the another location is a portion of another autonomous mobile robot.

7. The method of claim 1, wherein the another location is a conveyor system to further movement of the item.

8. The method of claim 1, wherein the another location is a shelf formed with the robot body within confines of the autonomous mobile robot.

9. An autonomous mobile robot, comprising:
a robot body comprising at least a drive system for moving the autonomous mobile robot to various positions in an environment;
an elevator mechanism secured to the robot body, the elevator mechanism at least comprising a movable platform and a first mechanism for providing vertical movement of the movable platform with respect to the robot body;
a rotary table integrally formed with the movable platform and in operable communication with the elevator mechanism and a second mechanism for providing rotary movement of the rotary table in a horizontal plane with respect to the movable platform and the robot body;
an end effector integrally formed with the rotary table and a third mechanism for providing linear movement of the end effector in the horizontal plane and along a diameter of the rotary table and for extending to a first position outside of the rotary table, the elevator mechanism and the autonomous mobile robot to move an item from a first surface external to the mobile robot onto the rotary table;
a set of fork members, wherein the set of fork members are positioned on opposite sides of the end effector and a fourth mechanism for providing linear movement of the set of fork members in the horizontal plane and along the diameter of the rotary table, the set of fork members providing support for the item as it is moved by the end effector from the first surface onto the rotary table;
a sensor system comprising a set of sensors positioned about the mobile robot for enabling movement of the mobile robot in the environment; and
a control system in operable communication at least with the drive system, the elevator mechanism, the rotary table, the end effector, the set of fork members, the sensor system and a communication system external to the mobile robot, the control system at least enabling the mobile robot to receive instructions with regard to a particular item to be captured and moved to a second surface.

10. The autonomous mobile robot of claim 9, wherein the second surface is positioned exterior to the autonomous mobile robot.

11. The autonomous mobile robot of claim 9, wherein the second surface is formed as a portion of another mobile robot.

12. The autonomous mobile robot of claim 9, wherein the second surface is formed as a conveyor system.

13. The autonomous mobile robot of claim 9, wherein:
the autonomous mobile robot further comprises a shelf structure integrally formed with the robot body and positioned for operable engagement with the elevator mechanism, the rotary table, the end effector and the set of fork members; and
the second surface is positioned as a portion of the mobile robot in the form of at least a shelf of the shelf structure thereby enabling the autonomous mobile robot to capture a plurality of items from a number of different locations.

14. The autonomous mobile robot of claim 9, wherein the instructions further comprise scheduling data that at least designates an order in which a set of items are to be loaded on to the autonomous mobile robot.

15. The autonomous mobile robot of claim 9, wherein the control system, using the sensor system, causes the autonomous mobile robot to capture the particular item at a location as a result of detecting a location beacon on the particular item at the location.

16. The autonomous mobile robot of claim 9, wherein the control system, using the sensor system, causes the autonomous mobile robot to capture the particular item at a location as a result of detecting a shape of the particular item at the location as specified in the instructions.

17. A system, comprising:
a remote control system comprising a communication device; and
an autonomous mobile robot being in communication with the communication device, wherein the autonomous mobile robot operates, as instructed by the communication device, to load an item on to the autonomous mobile robot, the autonomous mobile robot comprising:
a robot body comprising at least a drive system for moving the autonomous mobile robot in an environment;
an elevator mechanism secured to the robot body, the elevator mechanism at least comprising a movable platform and a first mechanism for providing vertical movement of the movable platform with respect to the robot body;
a rotary table integrally formed with the movable platform and in operable communication with the elevator mechanism and a second mechanism for providing rotary movement of the rotary table in a horizontal plane with respect to the movable platform and the robot body;
an end effector integrally formed with the rotary table and a third mechanism for providing linear movement of the end effector in the horizontal plane and along a diameter of the rotary table and for extending to a first position outside of the rotary table, the elevator mechanism and the mobile robot to move the item from a first surface external to the mobile robot onto the rotary table;
a set of fork members, wherein the set of fork members are positioned on opposite sides of the end effector and a fourth mechanism for providing linear movement of the set of fork members in the horizontal plane and along the diameter of the rotary table, the set of fork members providing support for the item as it is moved by the end effector from the first surface onto the rotary table;
a sensor system comprising a set of sensors positioned about the autonomous mobile robot for enabling movement of the mobile robot in the environment; and
a control system in operable communication at least with the drive system, the elevator mechanism, the rotary table, the end effector, the set of fork members, the sensor system and the communication device, the control system at least enabling the autonomous mobile robot to receive instructions with regard the item to be captured and moved to a second surface.

18. The system of claim 17, wherein the second surface is positioned exterior to the autonomous mobile robot.

19. The system of claim 17, wherein the control system, using the sensor system, causes the autonomous mobile robot to capture the item at a location as a result of detecting a location beacon on the item at the location.

20. The system of claim 17, wherein:
the autonomous mobile robot further comprises a shelf structure integrally formed with the robot body and positioned for operable engagement with the elevator mechanism, the rotary table, the end effector, and the set of fork members; and
the second surface is positioned as a portion of the mobile robot in the form of at least a shelf of the shelf structure thereby enabling the autonomous mobile robot to capture a plurality of items from a number of different locations.

* * * * *